United States Patent [19]

Ise et al.

[11] Patent Number: 4,866,623

[45] Date of Patent: Sep. 12, 1989

[54] CONTROLLER FOR AN ACCELERATION SLIP ON A DRIVING WHEEL

[75] Inventors: Kiyotaka Ise; Shinichi Matsumoto, both of Susono; Hiroharu Miyazaki, Toyota, all of Japan

[73] Assignee: Toyota Jidosha Kabushiki Kaisha, Aichi, Japan

[21] Appl. No.: 130,170

[22] Filed: Dec. 8, 1987

[30] Foreign Application Priority Data

Dec. 13, 1986 [JP] Japan ............................ 61-297242

[51] Int. Cl.$^4$ .................. G05D 17/02; B60T 8/32; B60K 31/04
[52] U.S. Cl. .................. 364/426.03; 180/197; 303/108; 364/426.01; 364/431.07
[58] Field of Search ............ 364/426.07, 426.03, 364/426.02, 148, 150, 426.04; 123/336; 303/103, 106, 108, 109; 180/197

[56] References Cited

U.S. PATENT DOCUMENTS

| | | | |
|---|---|---|---|
| 3,932,000 | 1/1976 | Needham et al. | 303/109 |
| 3,967,862 | 7/1976 | Hunter et al. | 303/103 |
| 4,078,845 | 3/1978 | Amberg et al. | 303/106 |
| 4,188,075 | 2/1980 | Rajput et al. | 303/105 |
| 4,583,611 | 4/1986 | Frank et al. | 364/426.02 |
| 4,648,663 | 3/1987 | Nomura et al. | 303/96 |
| 4,681,373 | 7/1987 | Nomura et al. | 303/106 |
| 4,681,374 | 7/1987 | Nakamura et al. | 303/106 |
| 4,722,411 | 2/1988 | Ohashi et al. | 123/336 |
| 4,739,856 | 4/1988 | Inagaki et al. | 364/426.03 |
| 4,774,667 | 9/1988 | Kuraoka et al. | 364/148 |

FOREIGN PATENT DOCUMENTS 61-85248 4/1986 Japan.
62-149545 7/1987 Japan.

Primary Examiner—Felix D. Gruber
Attorney, Agent, or Firm—Oliff & Berridge

[57] ABSTRACT

A controller for controlling an acceleration slip on a driving wheel of a vehicle comprising a vehicle speed detector, a driving wheel speed detector, a reference speed setting device for setting low and high reference speeds both higher than the detected vehicle speed, and engine output controller for executing a feedback control of an output of the engine of the vehicle so that the detected speed of the driving wheel approximates the low reference speed, a brake controller for executing a feedback control of a brake system of the driving wheel after the detected speed of the driving wheel exceeds the high reference speed, a brake monitor for detecting whether the brake control is executed, and a gain adjustor for making a feedback gain of the engine output control lower at a time when the brake control is detected as being executed than at a time when the brake control is detected as not being executed.

12 Claims, 10 Drawing Sheets

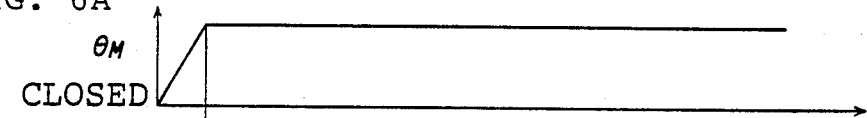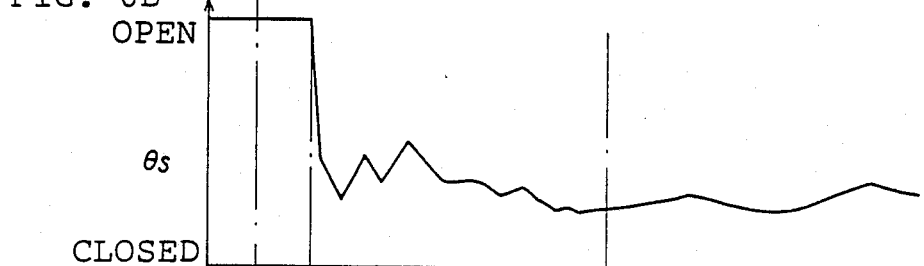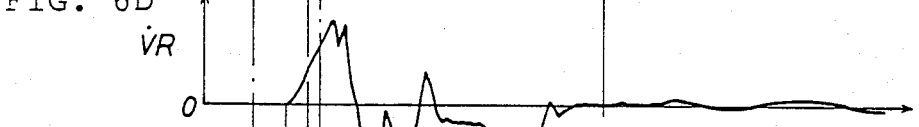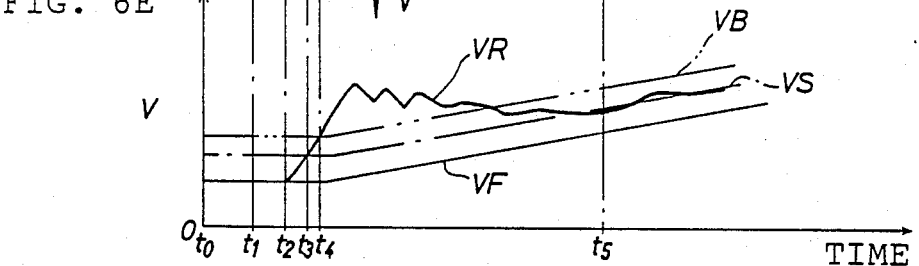

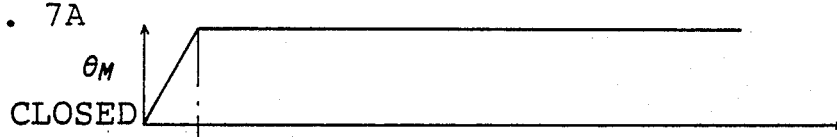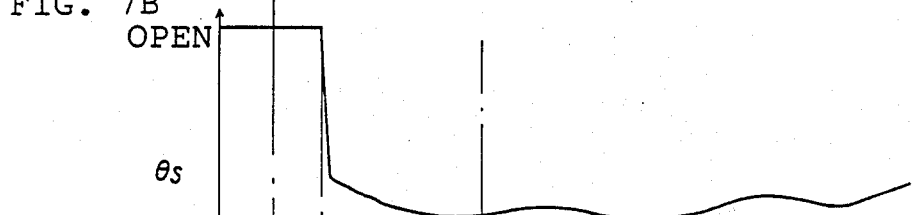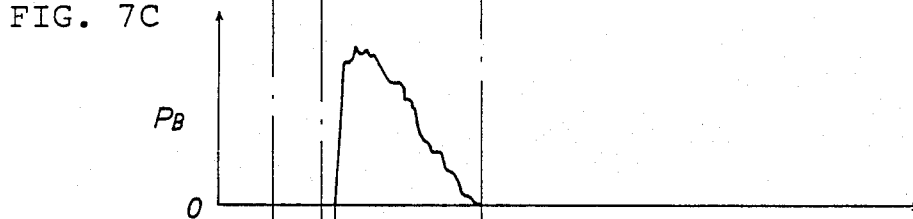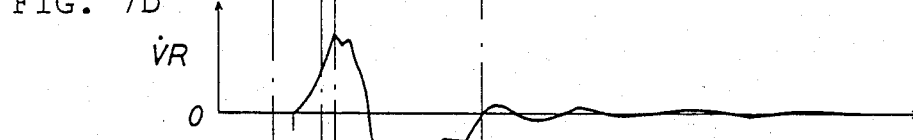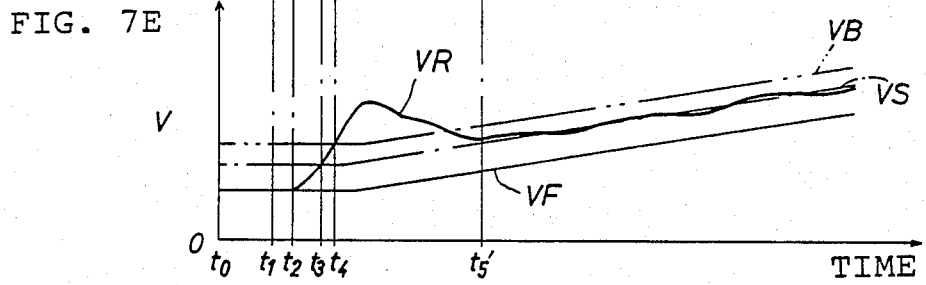

FIG. 8

| | ENGINE SPEED NE (x100rpm) | | | | | |
|---|---|---|---|---|---|---|
| MAIN THROTTLE OPENING $\theta_M$ (%) | | 0 | 4 | 8 | 12 | 16 | ... |
| | 0 | 1 | 1 | 1.2 | 1.4 | 1.6 | ... |
| | 5 | 1.4 | 1.4 | 1.3 | 1.3 | 1.4 | ... |
| | 10 | 2 | 2.1 | 2.2 | 2 | 1.8 | ... |
| | 15 | 4 | 4 | 4 | 2.8 | 3 | ... |
| | 20 | 4 | 4 | 4 | 4 | 3.5 | ... |
| | 25 | 4 | 4.5 | 5 | ... | ... | ... |
| | ⋮ | ⋮ | ⋮ | ⋮ | ⋮ | ⋮ | ⋮ |

CONTROLLER FOR AN ACCELERATION SLIP ON A DRIVING WHEEL

BACKGROUND OF THE INVENTION

This invention relates to an acceleration slip controller for controlling a slip that occurs between the driving wheel and the road surface during vehicle acceleration.

When an acceleration slip occurs, the vehicle does not accelerate as desired and fuel is wasted. For preventing the acceleration slip, various inventions have been disclosed. One of the inventions is disclosed by the assignee of the present application in the Japanese Unexamined Published Patent Application No. 61-85248 in which the acceleration slip on the driving wheel (or excessive revolution of the driving wheel during vehicle acceleration) is quickly reduced with the use of the engine output control and with the use of the braking system of the driving wheel. Among the measures to slow the driving wheels'revolution, a powerful braking system is utilized which causes mechanical wear of the brake pad and other parts. Therefore, another invention is disclosed in the Japanese Patent Application No. 60-294439 in which the engine output control is preferably executed rather than the brake control when the slip rate of the driving wheel is small, and the the brake control is started when the slip rate increases.

When both the engine output control and the brake control are prepared for reducing the acceleration slip, the initiation of each control is deliberately controlled. However in the prior art, when both controls are executed during a large slip rate condition, the engine output control and the brake control are executed independently. At this time, each of the control systems performs feedback control for adjusting the actual slip rate of the driving wheel toward a target slip rate (or to a target revolution speed). But, since the target is the same between the two control systems, the two controls are somewhat correlated rather than completely independent. As described above, the braking force is so strong in reducing the revolution speed of the driving wheel that the responsiveness of the brake feedback system is ten times faster than that of the engine output control system. When both the controls are executed without adjustment of the imblance in responsiveness, the engine output control is largely influenced by the brake control. Consequently, when the brake control is initiated during the engine output control, the engine output starts fluctuating greatly. This leads to vibration of the vehicle body and to a deteriorated control of the acceleration slip in which the feedback hunting persists and the acceleration is not efficiently controlled.

SUMMARY OF THE INVENTION

An object of the invention is, therefore, to achieve a desired acceleration of the vehicle by reducing the slip on the driving wheel.

Another object is to solve the problem of interference between the engine output control and the brake control which causes uncomfortable vibration when both feedback controls are executed during vehicle acceleration.

A further object is to improve the riding comfort and to extend the life of the parts and body of the vehicle by making the engine revolution and the body movement smoother while the acceleration slip is being controlled.

These and other objects are achieved by the present invention as set forth below. According to the invention, a controller for controlling an acceleration slip on a driving wheel of a vehicle comprises: vehicle speed detection means M1 for detecting a speed of the vehicle; driving wheel speed detection means M2 for detecting a speed of the driving wheel; reference speed setting means M3 responsive to the detected vehicle speed for setting a low reference speed and a high reference speed both higher than the detected vehicle speed; engine output control means M4 for executing a feedback control of an output of the engine of the vehicle so that the detected speed of the driving wheel approximates the low reference speed; brake control means M5 for executing a feedback control of a brake system of the driving wheel after the detected speed of the driving wheel exceeds the high reference speed; brake monitoring means M6 for detecting whether the brake control is executed; and gain adjusting means M7 for making a feedback gain of the engine output control lower at a time when the brake control is monitored to be executed than at a time when the brake control is monitored not to be executed.

BRIEF EXPLANATION OF THE DRAWINGS

The invention may be best understood by referring to the following description of the preferred embodiment and the drawings in which:

FIGS. 6A, 6B, 6C, 6D and 6E are timing charts of a main throttle valve opening $\theta_M$ (FIG. 6A), sub-throttle valve opening $\theta_S$ (FIG. 6B), brake oil pressure PB in the wheel cylinders of driving wheels (FIG. 6C), change rate VR of the driving wheel speed VR (FIG. 6D), and the driving wheel speed VR (FIG. 6E) in the acceleration slip control by the conventional control device;

FIGS. 7A, 7B, 7C, 7D and 7E are similar timing charts as FIGS. 6A, 6B, 6C, 6D and 6E but by the control device of the embodiment of the present invention;

FIG. 8 shows a part of a table for determining a correction factor K for use in the calculation of sub-throttle valve opening (rotational) rate.

DETAILED DESCRIPTION OF A PREFERRED EMBODIMENT

Figure 1:
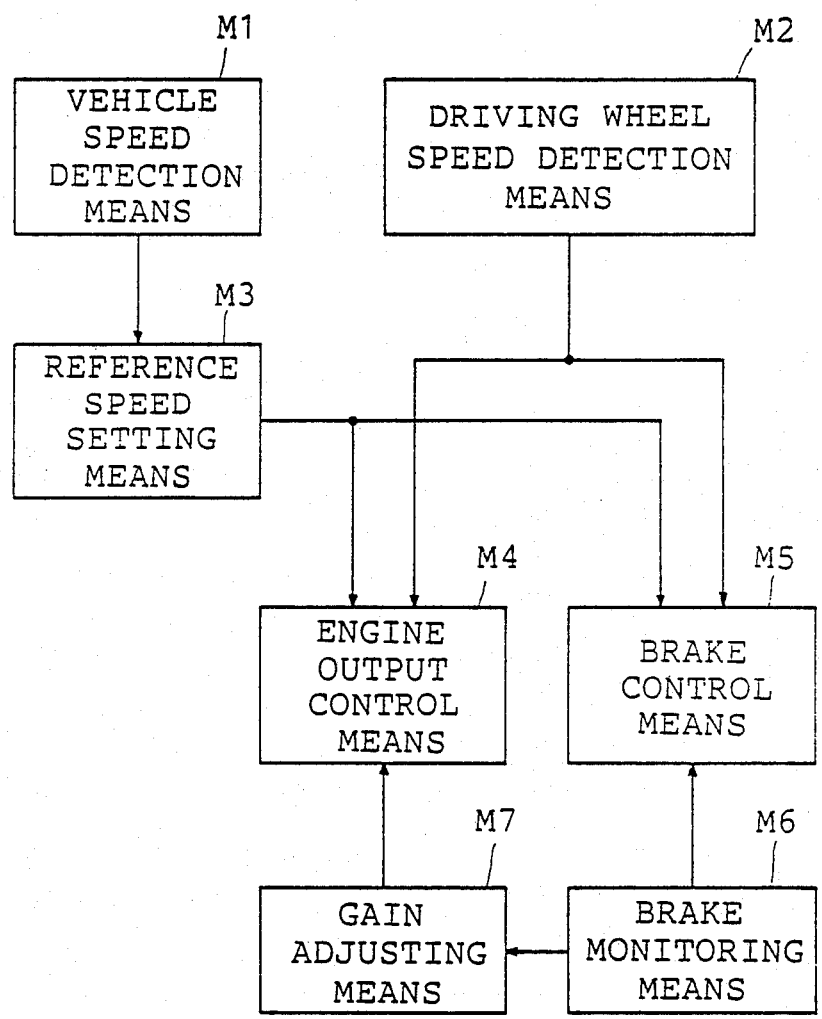
FIG. 1 is a block diagram showing a basic structure of the invention.
Figure 2:
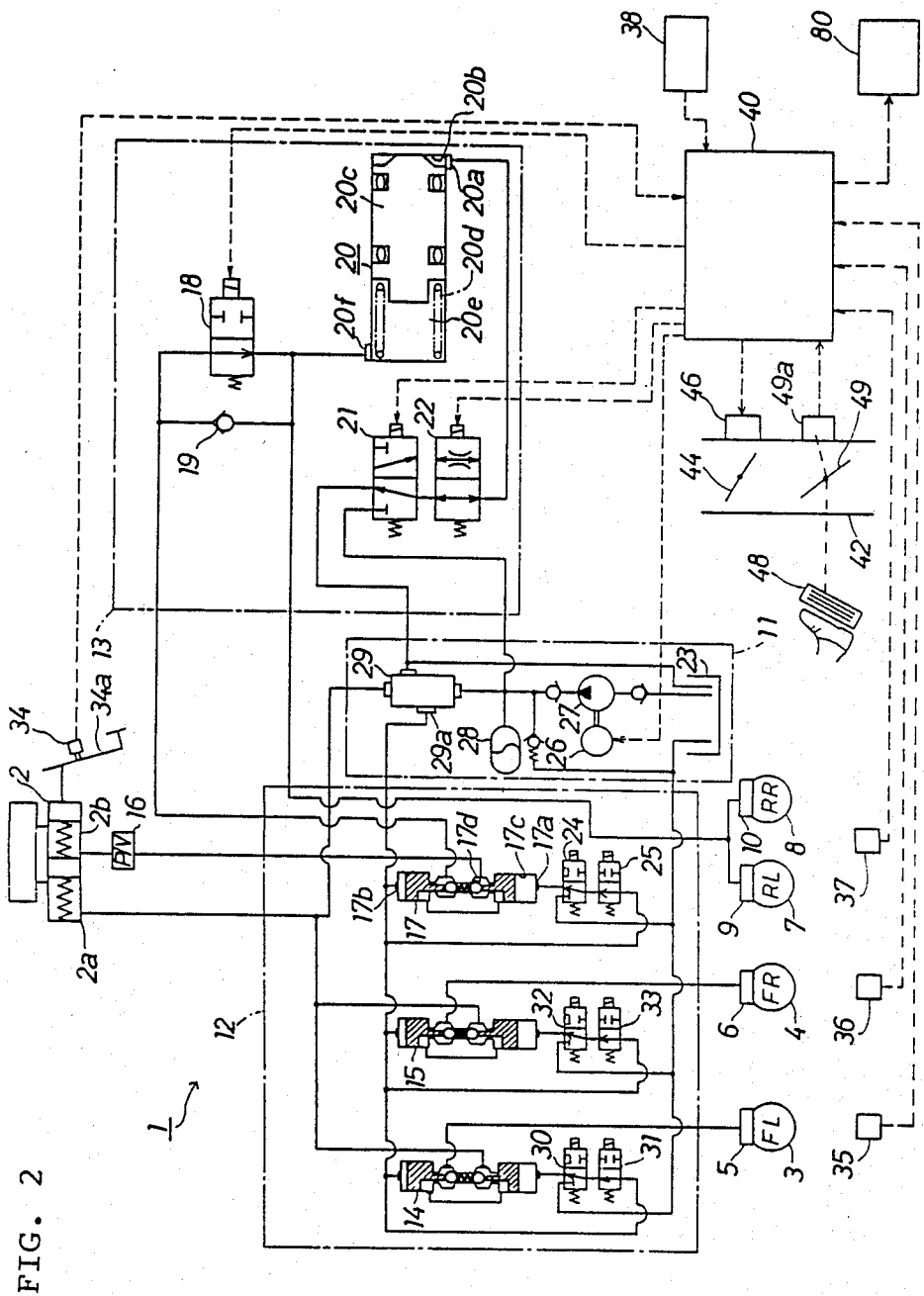
FIG. 2 is a circuit diagram of the oil pressure circuit and its control system of the embodiment.

Hereinafter, an embodiment of the present invention will be described referring to the drawings. The embodiment is a rear wheel driven vehicle equipped with the acceleration slip control system of the invention. In FIG. 2, an acceleration slip control system 1 includes: a master cylinder 2; left and right front non-driving wheels 3 and 4 and their wheel cylinders 5 and 6; left and right rear driving wheels 7 and 8 with their wheel cylinders 9 and 10; an oil pressure source 11; an oil circuit 12 for anti-skid control; and another oil circuit 13 for the acceleration slip control. The oil pressure source 11 and the oil circuits 12 and 13 are provided between the master cylinder 2 and the wheel cylinders 5, 6, 9 and 10.

Between a first chamber 2a of the master cylinder 2 and the wheel cylinders 5 and 6 of the left and the right front wheels 3 and 4 are, respectively, left and right front volume control valves 14 and 15 for the anti-skid control. Between a second chamber 2b of the master cylinder 2 and the wheel cylinders 9 and 10 of the left and right rear wheels 7 and 8 are: a proportional valve 16; rear volume control valve 17 for the anti-skid control; a first solenoid valve 18 and a check valve 19 which are situated in parallel; and a volume control valve 20 for the acceleration slip control.

When the anti-skid control is executed, the first solenoid valve 18 is not energized but rests at the position shown in FIG. 2, allowing communication between the anti-skid volume control valve 17 and the acceleration slip volume control valve 20. A second solenoid valve 21 and a third solenoid valve 22, sequentially connected to a control input port 20a of the acceleration slip volume control valve 20, are not energized but rest at the position shown in FIG. 2, allowing communication between a pressure control chamber 20b and a reservoir 23 of the oil pressure source 11.

Therefore, a piston 20c of the volume control valve 20 is biased by a spring 20d into the position as shown in FIG. 2. At this time, the anti-skid volume control valve 17 moves into one of three states depending on the energized or de-energized states of a first rear change valve 24 and a second rear change valve 25 sequentially provided thereto, as follows:

(1) An output port 29a of a regulator 29 and the first control input port 17a communicate. Here, the regulator 29 modulates the oil pressure from an oil pump 27 or from an accumulator 28 of the oil pressure source 11 according to the brake pedal displacement. The oil pump 27 is driven by an oil pump motor 26.

(2) The first input port 17a, the regulator 29 and the reservoir 23 are disconnected from one another.

(3) The first input port 17a and the reservoir 23 communicate.

On the other hand, a second control input 17b of the rear anti-skid volume control valve 17 always communicates with the output port 29a of the regulator 29. Therefore, the rear anti-skid volume control valve 17 responds as follows to the above three states. Namely, the oil pressure within a first oil chamber 17c having the first input port 17a is: (1) increased, (2) maintained, or (3) decreased according to the three states of the anti-skid volume control valve 17 described above. A volume of a brake pressure chamber 17d changes according to the pressure in the first oil chamber 17c. Through this mechanism, the rear anti-skid volume control valve 17: (1) increases, (2) maintains, or (3) decreases, the pressure in the left and right rear wheel cylinders 9 and 10 via the first solenoid valve 18 and the check valve 19. Similarly, the left and right front anti-skid volume control valves 14 and 15 work against the left and right front wheel cylinders 5 and 6 depending on the energized or de-energized states of left front first and second change valves 30 and 31 and right front first and second change valves 32 and 33. The first and second change valves 24, 25, 30, 31, 32 and 33 are energized or de-energized by an anti-skid control circuit (not shown).

When the acceleration slip control is executed, on the other hand, the first solenoid valve 18 is energized to be moved into a right side position, which blocks the oil path. This cuts the communication between the rear anti-skid volume control valve 17 and the acceleration slip volume control valve 20. At this time, the acceleration slip volume control valve 20 moves into one of four states, as follows, depending on the energized or de-energized states of the second and third solenoid valves 21 and 22 which are sequentially connected to the control input port 20a.

(11) The accumulator 28 and the control input port 20a communicate.

(12) The accumulator 28 and the control input port 20a communicate via a throttle valve of the third solenoid valve 22.

(13) The reservoir 23 and the control input port 20a communicate via a throttle valve of the third solenoid valve 22.

(14) The reservoir 23 and the control input port 20a communicate.

The acceleration slip volume control valve 20 responds to the above four states as follows. Namely, the pressure in the pressure control chamber 20b having the control input port 20a: (11) quickly increases, (12) slowly increases, (13) slowly decreases, or (14) quickly decreases, all in accordance with the above four states of the acceleration slip volume control valve 20. This pressure change changes the volume of the pressure control chamber 20b and moves the piston 20c to the right or left against the force of the spring 20d. With this movement of the piston 20c, pressure oil is supplied from an output port 20f of the chamber 20e to the left and right wheel cylinders 9 and 10, making the pressure within the wheel cylinders 9 and 10: (11) quickly increase, (12) slowly increase, (13) slowly decrease, or (14) quickly decrease, all according to the above four states of the acceleration slip volume control valve 20.

The acceleration slip control device 1 includes: a pedal switch 34 for outputting ON/OFF signals according to the depression of a brake pedal 34a; a left front wheel speed sensor 35, a right front wheel speed sensor 36 and a rear wheel speed sensor 37 for sensing the revolution speed of the left front wheel 3, the right front wheel 4 and the rear wheels 7 and 8 respectively; and an engine speed sensor 38 for sensing the engine revolution speed. The output signals from the above switch and sensors are input into an acceleration slip control circuit 40 and the control circuit 40 controls and drives the above described first, second and third solenoid valves 18, 21 and 22 and the oil pump motor 26.

The acceleration slip control device 1 also controls the acceleration slip, before controlling the brake system, by metering an intake air for the internal combustion engine. Namely, for preventing the excessive slip on the driving wheels when a main throttle valve 49 of the engine, linked with an accelerator pedal 48, is suddenly opened wide, a control signal is outputted to the drive motor 46 of a sub-throttle valve 44 provided sequentially with the main throttle valve 49 in an intake pipe 42 of the engine. A throttle position sensor 49a is attached to the main throttle valve 49 and outputs a signal proportional to the opening of the main throttle valve 49 to the acceleration slip control circuit 40. The throttle position sensor 49a also includes an idle switch which outputs an ON signal when the main throttle valve 49 is completely closed.

Figure 3:
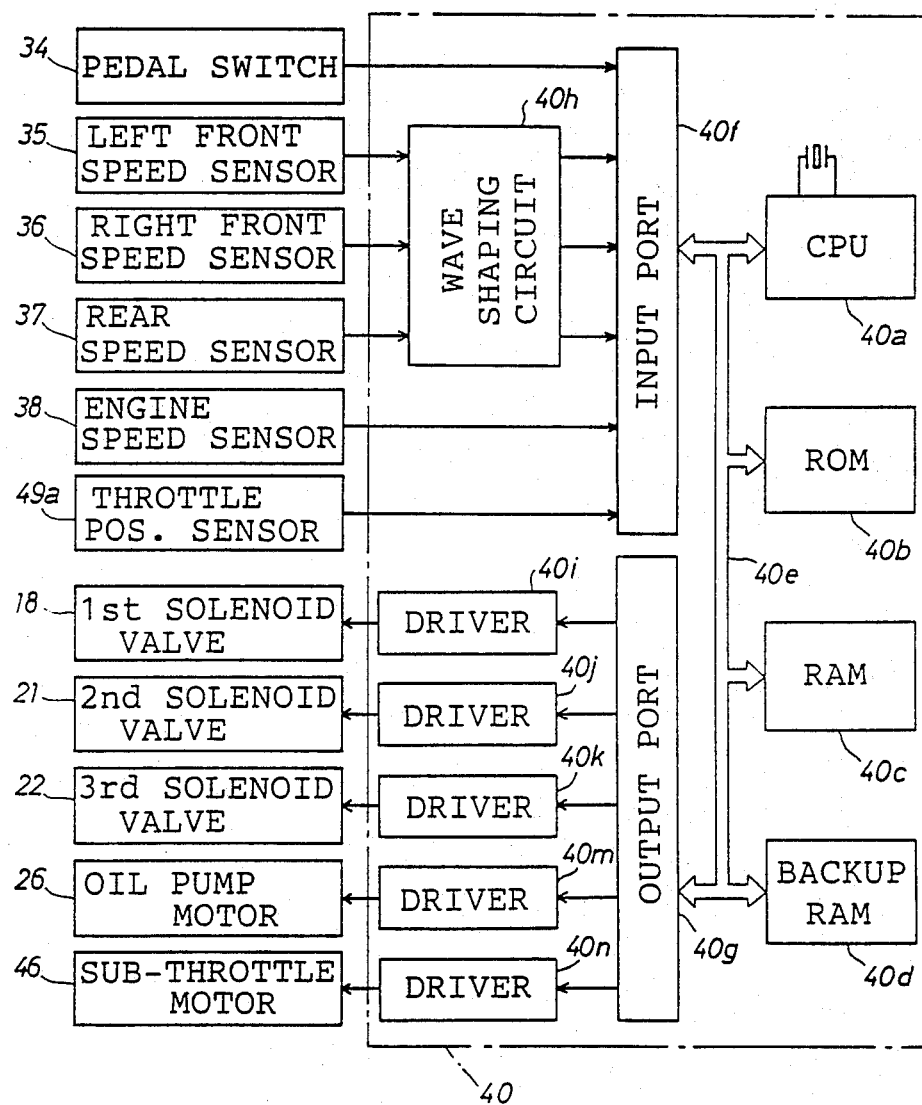
FIG. 3 is an electrical block diagram of the acceleration slip control circuit of the embodiment.

The structure of the acceleration slip control circuit 40 is here explained with FIG. 3. The control circuit 40 is a logic circuit including: CPU 40a, ROM 40b, RAM 40c, backup RAM 40d, input and output ports 40f and 40g, wave shaping circuit 40h, and driver circuits 40i, 40j, 40k, 40m and 40n for solenoid valves and motors. The pedal switch 34, the engine speed sensor 38 and the throttle position sensor 49a are directly connected to the input port 40f and the speed sensors 35, 36 and 37 for the left front, right front and rear wheels, respectively, are connected via the wave shaping circuit 40h to the input port 40f. The CPU 40a receives signals from these switches and sensors via the input port 40f, processes the signal data and outputs control signals to the first, second, and third solenoid valves 18, 21, and 22, oil pump motor 26 and the sub-throttle valve motor 46 via the output port 40g and the driver circuits 40i, 40j, 40k, 40m and 40n.

Figure 4A:
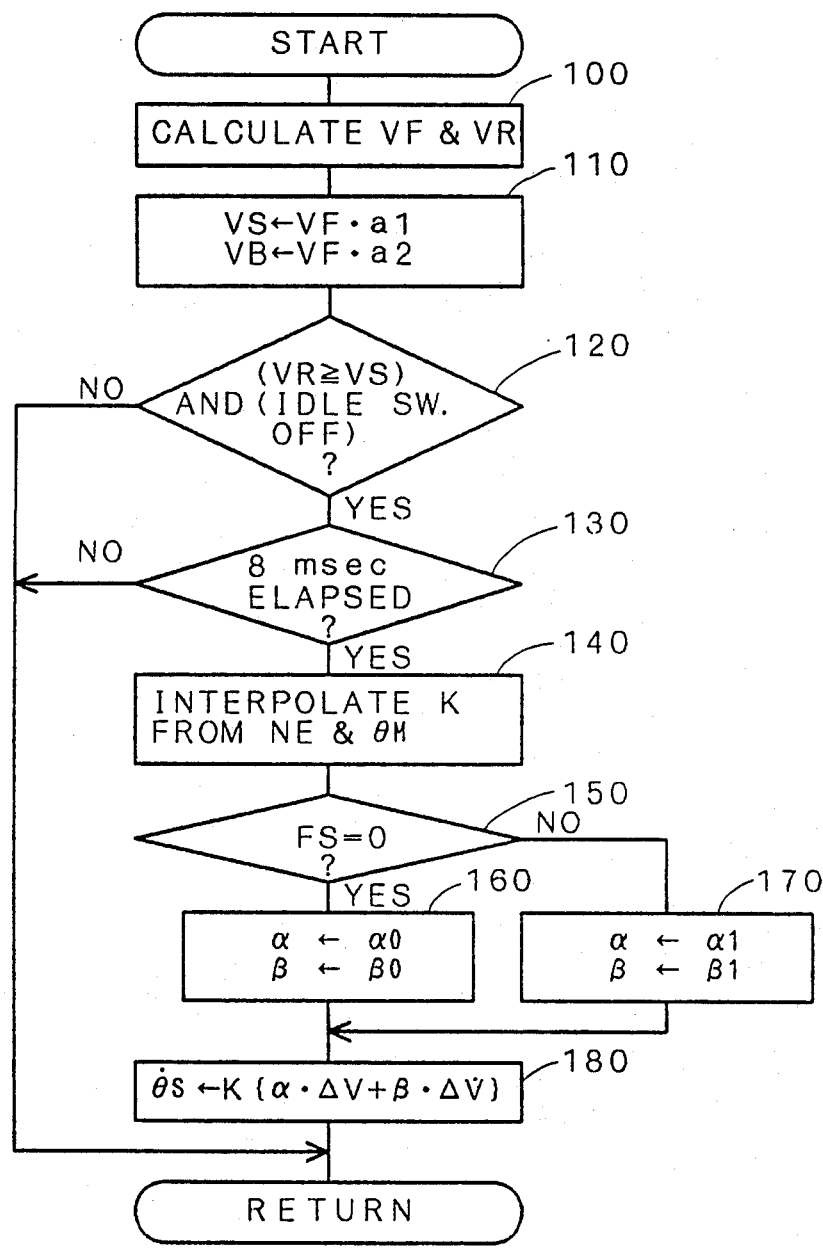
FIG. 4A is a flow chart for controlling the acceleration slip by the embodiment.
Figure 4B:
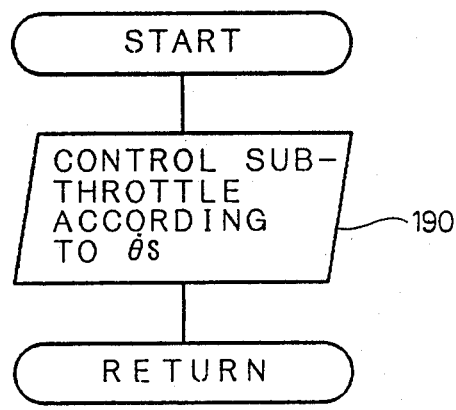
FIG. 4B is a flow chart of a sub-throttle valve opening control routine.
Figure 5:
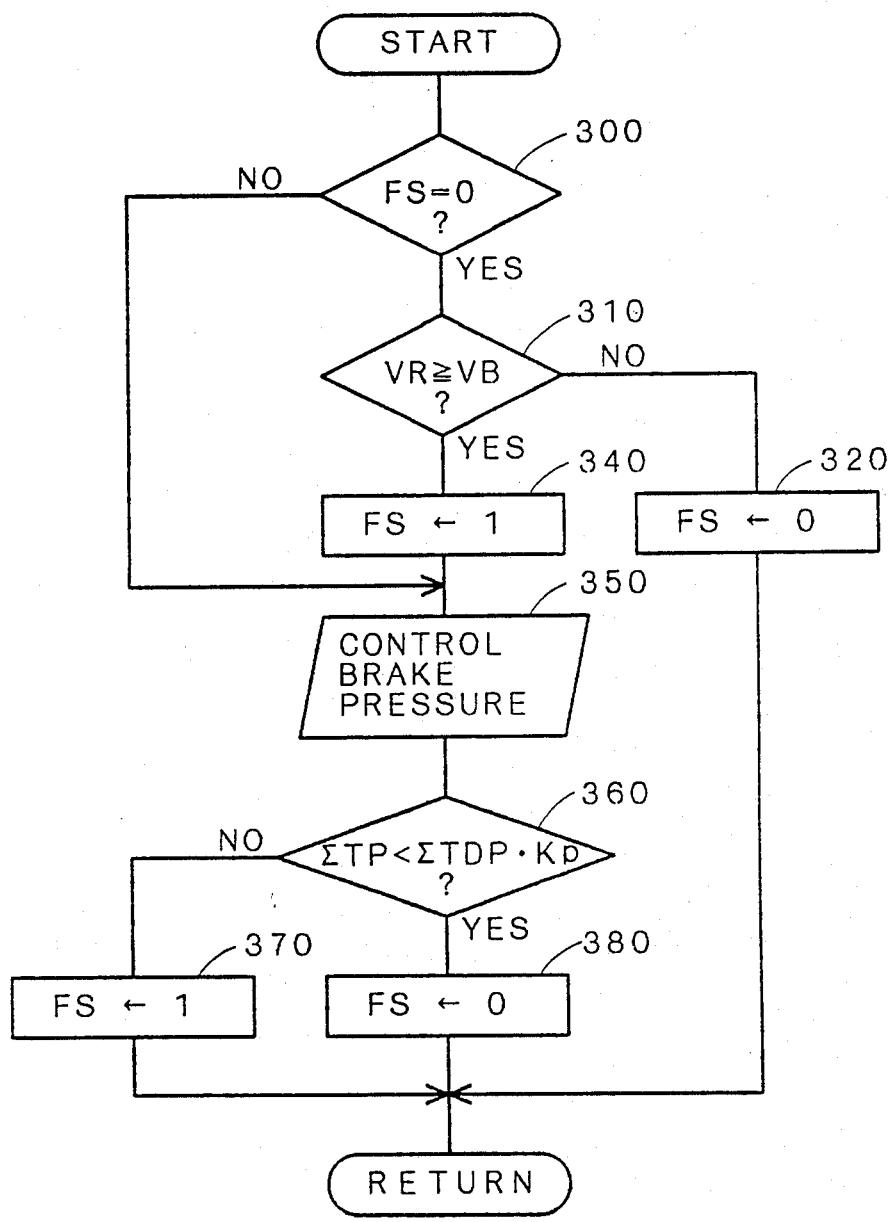
FIG. 5 is a flow chart for a brake pressure control in the acceleration slip control of the embodiment.

The processing executed in the acceleration slip control circuit 40 is hereinafter explained with regard to the flowcharts of FIGS. 4A, 4B and 5. The flow charts of FIGS. 4A and 4B are for controlling the acceleration slip of the driving wheels by adjusting the opening of the sub-throttle valve 44 which is repeatedly executed at predetermined intervals. When the routine of FIG. 4A is started, revolution speed of the left front, right front and rear wheels is input from the respective sensors 35, 36 and 37 and a front wheel peripheral speed (speed of non-driving wheels) VF and a rear wheel peripheral speed (speed of driving wheels) VR are calculated at step 100. The front wheel peripheral speed VF is calculated by multiplying the average value of outputs of the left and right front speed sensors 35 and 36 (or greater one of the outputs) by the peripheral speed VR is similarly calculated. From the front wheel peripheral speed VF, i.e. the speed of non-driving wheels, a reference value VS for the control of the sub-throttle valve and another reference value VB for the control of the brake system are calculated at step 110 as follows.

$$VS = VF \cdot a1 \quad (21)$$

$$VB = VF \cdot a2 \quad (22)$$

Here, a1 and a2 are constants both greater than unity and have a relationship such that a1<a2. Since VS is, as described later, a target peripheral speed for the driving wheels 7 and 8 in the feedback control of the sub-throttle valve opening, the value a1 is selected such that the driving force (or traction force) of the driving wheel on the road is maximum. For example, the value a1 is set at 1.12 to 1.20. Instead of the above formulae (21) and (22), the following equations may be used to determine the reference values VS and VB.

$$VS = VF + b1 \quad (21')$$

$$VB = VF + b2 \quad (22')$$

where, 0<b1<b2.

Then, at step 120, it is determined whether the condition to start the acceleration slip control exists. Specifically, it is determined whether the driving wheel speed VR exceeds the sub-throttle control reference value VS and whether the idle switch is off (i.e., the main throttle valve 49 is not closed). When this condition is not satisfied, further processing is not executed. Even if the condition is satisfied at step 120, the acceleration slip control is not begun until 8 msec elapses at step 130. The delay in processing at step 130 is introduced because the slip control should not be started when the driving wheels 7 and 8 are coasting through a sporadic dip or irregularity of the road surface.

Figure 9:
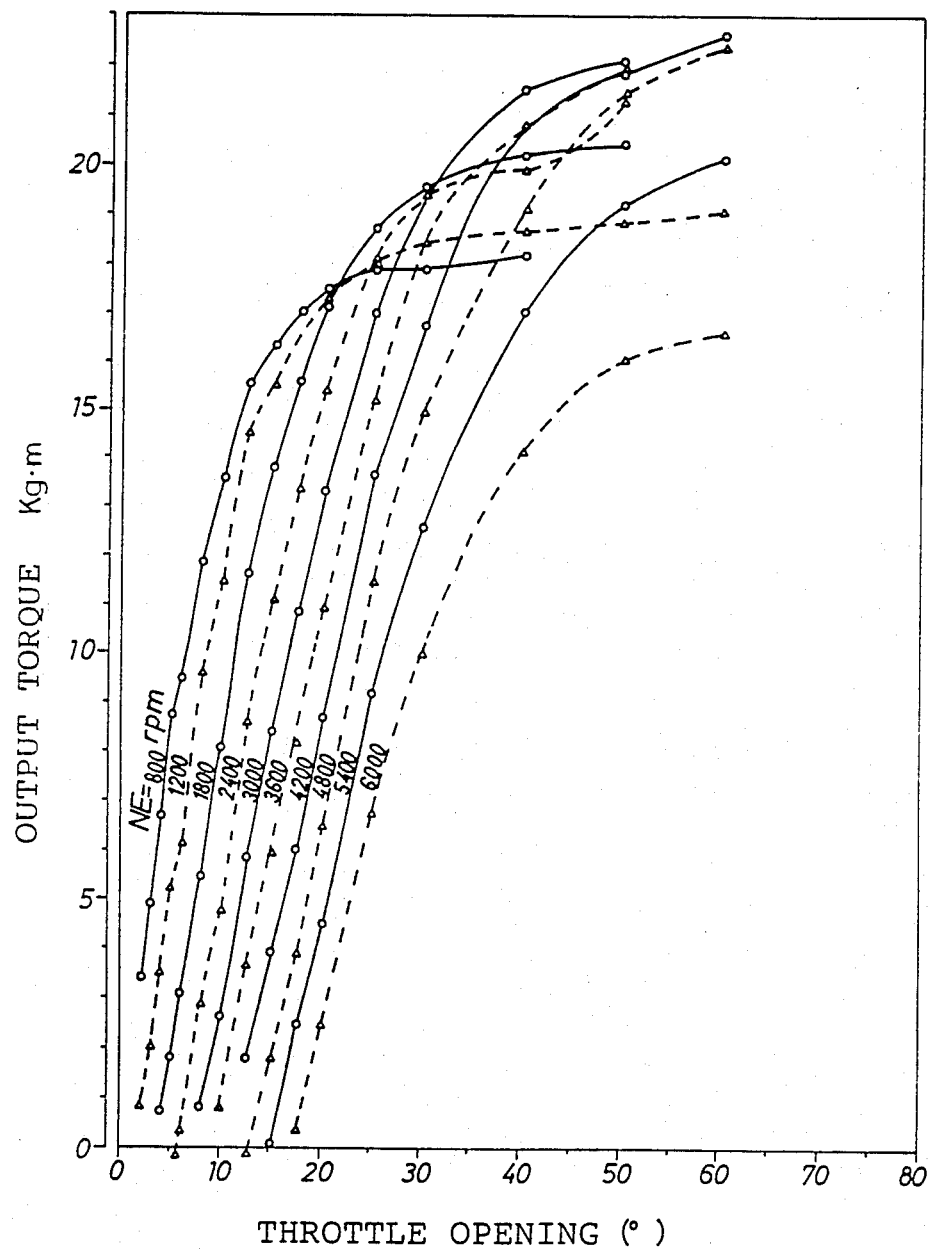
FIG. 9 is a graph showing the relationship between the throttle valve opening and the engine output torque.

When the condition step 120 remains after the 8 msec has elapsed, a correction factor K is determined at step 140 by interpolation of data from a look up table as shown in FIG. 8 based on both the revolution speed NE of the crank shaft sensed by the engine speed sensor 38 and on the opening $\theta_M$ of the main throttle valve as sensed by the throttle position sensor 49a. This correction factor K is introduced to compensate for the non-linear relationship between the throttle valve opening and the engine output torque as shown in FIG. 9. Namely, it is introduced to prevent an unnecessarily excessive opening of the sub-throttle valve 44 which causes poor response of the sub-throttle valve 44 while it is closing, because, as seen in FIG. 9, the output torque responds briskly at a lower engine speed but it hardly responds at a middle or higher engine speed.

At steps 150, 160 and 170, depending on the value of a flag FS, predetermined values $\alpha 0$, $\beta 0$ or $\alpha 1$, $\beta 1$ are put into feedback coefficients (gain) $\alpha$ and $\beta$. When FS=0, $\alpha 0$ and $\beta 0$ are put into $\alpha$ and $\beta$, respectively, at step 160. When FS=1, $\alpha 1$ and $\beta 1$ are put into $\alpha$ and $\beta$, respectively, at step 170. Here, the flag FS indicates, as described later, whether the brake control is executed. When FS=1, the brake control is executed, and when FS=0, the brake control is not executed. The predetermined values $\alpha 0$, $\beta 0$ or $\alpha 1$, $\beta 1$ have relationships $\alpha 0 > \alpha 1$ and $\beta 0 > \beta 1$. A specific example of the values are: $\alpha 0 = 0.98$ and $\beta 0 = 12$ while $\alpha 1 = 0.81$ and $\beta 1 = 0$.

Then, at step 180, a time derivative $\dot{\theta}s$ of a target value $\theta s$ of the sub-throttle valve 44 is calculated by the following equation.

$$\dot{\theta}s = K\{\alpha \cdot \Delta V + \beta \cdot \Delta \dot{V}\} \quad (23)$$

Here: $\alpha$ is a proportional gain; $\beta$ is a differential gain; $\Delta V$ is a difference (VS−VR) between the reference driving wheel speed VS and the actual driving wheel speed VR; and $\Delta \dot{V}$ is its time derivative. As described above, when the brake control is executed on the driving wheels, the coefficients $\alpha$ and $\beta$ are set at $\alpha 1$ and $\beta 1$, respectively, which is smaller than $\alpha 0$ and $\beta 0$ set when the brake control is not executed. Then the present execution of the routine ends and the routine is repeatedly executed thereafter with the value $\dot{\theta}s$ being updated every time.

Using this updated value of $\dot{\theta}s$, the sub-routine of FIG. 4B is repeated at predetermined intervals to control the opening degree and the opening rate of the sub-throttle valve 44 at step 190.

The brake control is explained with reference to FIG. 5.

When the slip ratio is so small that the brake control is not necessary (VR<VB), the following occurs.

First, at step 300, it is determined whether the flag FS is reset (FS=0). The flag FS indicates, as described before, whether brake control is started. Since FS=0 at first, the result is YES at step 300, and it is determined at step 310 whether the sensed driving wheel speed VR is greater than the reference value VB which is set at step 100. As the slip ratio is small at this time, the result is NO and the flag FS is reset to 0 at step 320. In this small slip condition, the above processings are repeated.

When the slip ratio is so large that the brake control is necessary (VR≧VB), the following occurs.

The determination result at step 310 is YES and the flag FS is set to 1 at step 340. Then the brake oil pressure is controlled at step 350. The brake oil pressure control is executed as in Table 1.

TABLE 1

| speed | acceleration | | |
|---|---|---|---|
| | $\dot{V}R < G2$ | $G2 \leq \dot{V}R < G1$ | $\dot{V}R \geq G1$ |
| $VB \leq VR$ | SD | SU | FU |
| $VS \leq VR < VB$ | FD | SD | SD |
| $VR < VS$ | FD | FD | FD |

In the table, G1 is a positive predetermined acceleration, G2 is a negative predetermined acceleration, FU signifies rapid increase in the oil pressure in the prescribed acceleration slip control device 1, SU signifies slow increase, FD signifies rapid decrease and SD signifies slow decrease.

Namely, an acceleration of the driving wheel $\dot{V}R$ is first calculated and when the acceleration $\dot{V}R$ exceeds G2 (and in this case $VR \geq VB$), the oil pressure is increased (quickly or slowly) to decrease the revolution speed of the driving wheel by the brake system.

Then, at step 360, it is determined whether there is no oil pressure. Here the oil pressure is determined to have ceased when the accumulated value $\Sigma TP$ of the oil pressure increasing time TP is less than the accumulated value $\Sigma TDP$ of the oil pressure decreasing time TDP multiplied by a correction factor Kp. Here the correction Kp is introduced because there is a difference between the rate of change of the increase and the decrease of the oil pressure. When the oil pressure has not completely ceased and the determination result at step 360 is NO, the flag FS remains set at 1 at step 370.

When the excessive slip rate on the driving wheel is decreased and accordingly the oil pressure has ceased, the determination result at step 360 is YES and the flag FS is reset to 0 at step 380.

As described above, during the feedback control of the driving wheel speed toward a target speed VS by controlling the engine output, i.e., by controlling the opening of the sub-throttle valve 44, the feedback gain is varied depending on whether the brake system is simultaneously controlling the driving wheels 7 and 8 (steps 150, 160 and 170 of FIG. 4A). Specifically, when it is determined from the value of the flag FS that the brake control is being executed, the feedback gains $\alpha$ and $\beta$ are set at a larger value $\alpha 0$ and $\beta 0$, respectively, while they are set at smaller values $\alpha 1$ and $\beta 1$, respectively, when it is determined that the brake oil pressure is being exerted on the driving wheels 7 and 8. By these measures, the moving speed $\theta s$ of the sub-throttle valve 44 is small while the brake control is simultaneously executed, preventing excessive opening or closing and the feedback hunting phenomenon of the sub-throttle valve 44. On the other hand, while the brake control is not executed, the engine output control is quickly executed with high responsiveness to the error $\Delta V$ (a difference of the driving wheel speed VR from the target speed VS) and its changing rate $\Delta \dot{V}$ in order to bring the driving wheel speed VR to the target VS. It is preferable to make the differential gain $\beta 1$ very small to enhance the above effects.

Referring to the timing charts of FIGS. 6A and 6B, the above embodiment is further explained. In FIGS. 6A and 6B, the brake oil pressure PB corresponds to the difference $\Sigma TP - \Sigma TDP \cdot Kp$ between the increasing accumulation $\Sigma TP$ and the decreasing accumulation $\Sigma TDP \cdot Kp$ of the oil pressure increasing/decreasing time.

When a vehicle is cruising at a constant speed, the main throttle valve 49 is opened widely from a time point t0 to a time point t1 (FIGS. 6A and 7A) to quickly accelerate the vehicle. At a time point t2, and acceleration slip begins on the driving wheels 7 and 8 (FIGS. 6D, 6E, 7D and 7E); at a time point t3, the driving wheel speed VR exceeds the sub-throttle valve control reference value VS (FIGS. 6E and 7E); and at a time point t4, VR exceeds the higher brake control reference value VB (FIGS. 6E and 7E). Accordingly, at the time point t3, the control on the opening $\theta s$ of the sub-throttle valve is started (FIGS. 6B and 7B) and, at the time point t4, the brake control is started (FIGS. 6C and 7C). Up to the time point t4, the control by the present embodiment is the same as the control by the conventional control device. From the time point t4, the sub-throttle opening control and the brake control are simultaneously executed. According to the present embodiment, when the change rate $\theta s$ of the sub-throttle valve opening is small, the opening does not change greatly but gradually (FIG. 7B) despite the rapid change in the driving wheel speed VR and its change rate $\dot{V}R$. Therefore, the brake control according to this embodiment ends at t5' (FIG. 7C) which is earlier than at t5 (FIG. 6C) according to the conventional device.

Obviously, many modifications and variations of the present invention are possible in the light of above teachings. It is therefore to be understood that within the scope of the appended claims, the invention may be practiced otherwise than as specifically described. For example, through the brake oil pressure is determined to be zero by calculation from the oil pressure increasing-/decreasing time TP, TDP and the correction factor Kp in the above embodiment, the direct measurement of the brake oil pressure in the driving wheel cylinders 9 and 10 with some kind of pressure gauge yields the same effect as the present invention. In the feedback control for the sub-throttle valve 44, the moving rate $\theta s$ of the sub-throttle valve 44 is determined from two terms, as shown in equation (23): a proportional term of $\Delta V$ and a differential term of $\Delta \dot{V}$. The moving rate $\theta s$ may be, of course, determined from either of the terms or it may be determined from other terms. However, the important thing is that the coefficient for the feedback terms is varied depending on the execution and non-execution of the brake control. Further, through the engine output control is executed by the control of the sub-throttle valve in the above embodiment, it may be executed by the control of fuel injection or ignition timing.

What is claimed is:

1. A controller for controlling an acceleration slip on a driving wheel of a vehicle comprising:
   vehicle speed detection means for detecting a speed of the vehicle;
   driving wheel speed detection means for detecting a speed of the driving wheel;
   processor means for controlling the acceleration slip, said processor means including
   reference speed setting means responsive to the detected vehicle speed for setting a low reference speed and a high reference speed both higher than the detected vehicle speed;
   engine output control means for executing a feedback control of an output of the engine of the vehicle so that the detected speed of the driving wheel approximates the low reference speed;
   brake control means for executing a feedback control of a brake system of the driving wheel after the detected speed of the driving wheel exceeds the high reference speed;

brake monitoring means for detecting whether the brake control is executed; and gain adjusting means for making a feedback gain of the engine output control means lower at a time when the brake control is detected to be executed than at a time when the brake control is detected not to be executed.

2. The acceleration slip controller according to claim 1 wherein the vehicle speed detection means comprises a speed detector provided on a non-driving wheel.

3. The acceleration slip controller according to claim 1 wherein the reference speed setting means sets the low and high reference speeds by multiplying the detected vehicle speed by predetermined values greater than unity.

4. The acceleration slip controller according to claim 1 wherein the reference speed setting means sets the low and high reference speeds by adding predetermined values to the detected vehicle speed.

5. The acceleration slip controller according to claim 1 wherein the low reference speed is set at a value at which friction between the driving wheel and the road surface is a maximum.

6. The acceleration slip controller according to claim 1 wherein the engine of the vehicle comprises a sub-throttle valve provided in series with a normally provided throttle valve, and the engine output control means controls the opening of the sub-throttle valve.

7. The acceleration slip controller according to claim 6 wherein the brake monitoring means determines that the brake control means is not executed when an accumulated hydraulic pressure control signal to the brake system becomes equal to or less than zero.

8. The acceleration slip controller according to claim 1 wherein the engine output control means controls the opening of a throttle valve of the engine.

9. The acceleration slip controller according to claim 8 wherein an opening/closing speed $\dot{\theta}s$ of the throttle valve is controlled according to a formula $$\dot{\theta}s = K(\alpha \cdot \Delta V + \beta \cdot \Delta \dot{V}),$$

where K is a coefficient depending on the engine conditions, $\alpha$ and $\beta$ are coefficients depending on the braking control condition, $\Delta V = VS - VR$, $\Delta \dot{V}$ is a change rate of $\Delta V$, VR is an actual speed of the driven wheel and VS is a target speed.

10. The acceleration slip controller according to claim 9 wherein the coefficients $\alpha$ and $\beta$ are set at lower values at a time when the brake control is detected to be executed than at a time when the brake control is detected not to be executed.

11. The acceleration slip controller according to claim 9 wherein the coefficient $\beta$ is set at zero when the brake control is detected to be executed.

12. A method for controlling an acceleration slip on a driving wheel of a vehicle having steps of:

detecting a speed of the vehicle;

detecting a speed of the driving wheel;

setting a low reference speed and a high reference speed both higher than the detected vehicle speed;

executing a feedback control of an output of the engine of the vehicle so that the detected speed of the driving wheel approximates the low reference speed;

executing a feedback control of a brake system of the driving wheel after the detected speed of the driving wheel exceeds the high reference speed; and controlling the feedback gain of the engine output control so as to lower at a time when the brake control is executed than at a time when the brake control is not executed.

* * * * *